Nov. 22, 1955 E. W. S. NICHOLSON 2,724,686
STRIPPER FOR FLUIDIZED CONTACT SOLIDS
Filed Feb. 8, 1952 3 Sheets-Sheet 2

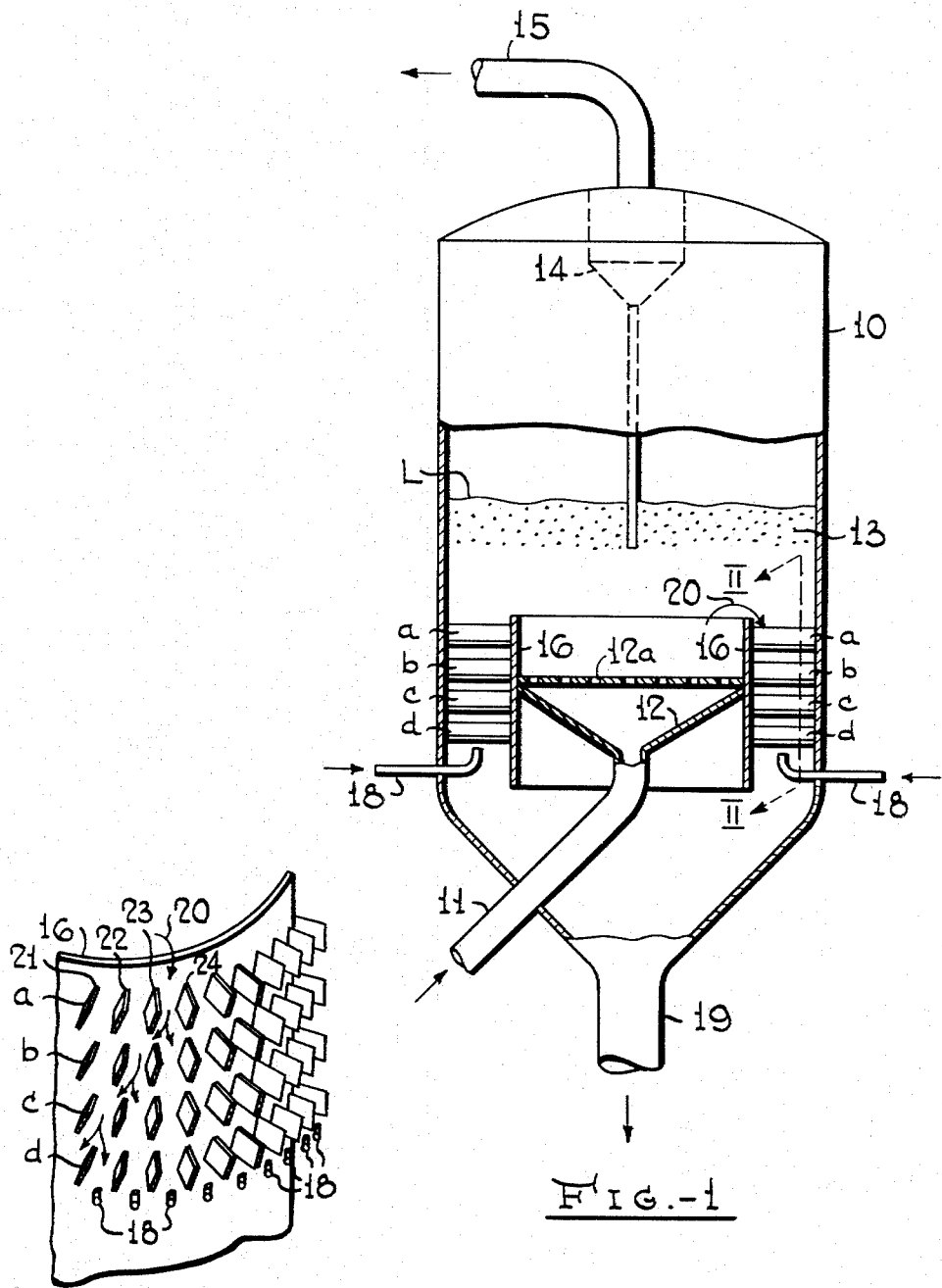

Edward W. S. Nicholson Inventor
By Peter H. Smolka Attorney

United States Patent Office 2,724,686
Patented Nov. 22, 1955

2,724,686

STRIPPER FOR FLUIDIZED CONTACT SOLIDS

Edward W. S. Nicholson, Baton Rouge, La., assignor to Esso Research and Engineering Company, a corporation of Delaware Application February 8, 1952, Serial No. 270,552

7 Claims. (Cl. 196—52)

This invention relates to an improved apparatus and method for intimately contacting finely divided solid particles with a gas. In particular the invention relates to stripping volatile hydrocarbons from a powdered cracking catalyst before the latter is passed from a "fluid" conversion zone to a "fluid" regeneration zone. Still more specifically, relatively complete stripping of spent catalyst is obtained in accordance with this invention by passing the catalyst through an annular stripper provided with a series of spaced slanted baffle sections so arranged as to move the catalyst along a helical downward path across the rising stripping gas.

In "fluid" catalytic cracking, large quantities of spent catalyst are continuously circulated back and forth between a conversion zone where the hydrocarbon feed is cracked and a regeneration zone where carbonaceous deposits are burned off the catalyst particles. In such an operation, it is obviously desirable to prevent valuable hydrocarbons from passing with the spent catalyst from the reactor to the regenerator. Otherwise, apart from the uneconomic waste of the hydrocarbons themselves, their presence in the spent catalyst stream increases the amount of burning required in the regenerator, thereby raising air compression costs and also increasing the risk of catalyst deactivation by excessive heat. Accordingly, various devices and methods have been proposed heretofore for the purpose of effecting the removal of hydrocarbons from spent fluidized catalyst.

Best success to date has been obtained in this field with so-called cellular strippers wherein catalyst flow is equalized into a number of individual baffled vertical cells, each supplied with a single steam injector for stripping gas. However, in commercial operations even in these devices poor stripping is frequently encountered because catalyst, scale and the like may cause plugging of the steam injector or the steam distributing orifices, with the result that steam flow is interrupted to at least some of the cells. Thus, the catalyst particles passing through such "dead" cells leave the stripper almost entirely unstripped, contributing to increased combustible matter passing to the regenerator. Considering that commercial units of this type nowadays are intended to remain on stream without interruption for periods of a year or more, it will be appreciated that plugging of at least some of the injectors or orifices is virtually unavoidable over such great lengths of time and that the extent of stripping is thereby adversely affected for the remainder of the run.

It is the principal object of this invention to reduce the necessary combustion in the regenerator to a minimum by effecting substantially complete stripping of spent cracking catalyst before the latter is introduced into the regeneration zone. A more specific object is to provide the art with a stripping device capable of uniformly stripping volatile materials from powdered solids at high and substantially constant efficiencies over long periods of time. Another object is to provide a stripper relatively free from unbalanced mechanical strains. Still other objects as well as the nature and operation of the invention will become apparent from the subsequent description and accompanying drawing wherein identical numerals are used for analogous parts in all figures and wherein:

Figure 1 represents a vertical longitudinal section of a simple form of an apparatus embodying the present invention;

Figure 2 is a sectional perspective view taken on line II—II of Fig. 1 and illustrates the main details of the novel construction of the stripping section;

Figure 3:
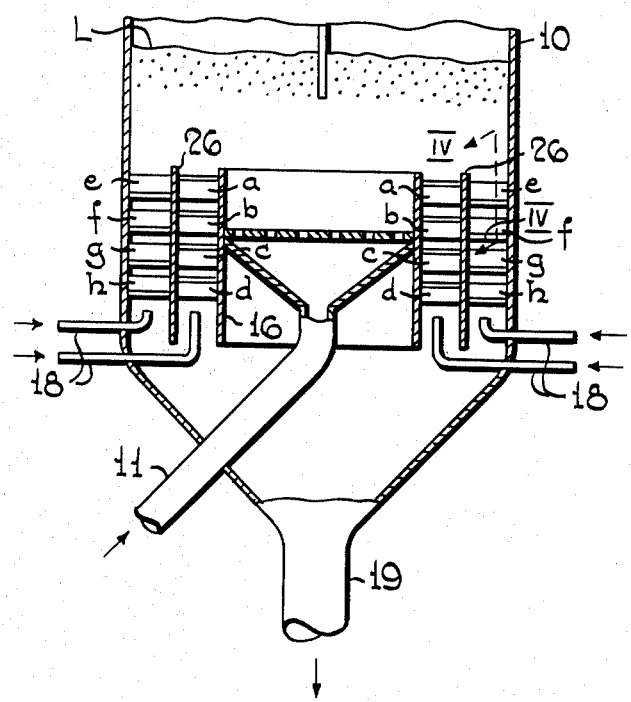
Figure 3 represents a vertical longitudinal section of the stripper portion and associated parts of a preferred form of an apparatus embodying this invention.

Referring to Fig. 1, in using the described apparatus for cracking hydrocarbon oils, a feed mixture containing about 1 to 10 or 20 pounds of powdered catalyst per pound of oil vapors is introduced into a conventional cylindrical reactor shell 10 by way of inlet line 11 which terminates in an inverted distributor cone 12 having a perforated grid 12a. The superficial linear velocity of the oil vapors passing upwardly through reactor 10 is conventionally controlled within the range of about 0.5 to 5 feet per second, or preferably between about 1 and 3 feet per second. Thus the bulk of the catalyst settles in the form of a dense fluidized mass 13 in the lower portion of the reactor while a more dispersed phase of catalyst in oil vapor is formed in the upper portion of the reactor above the upper level L of dense mass 13. The cracked oil vapors are withdrawn from the top of the reactor by way of cyclone 14 or equivalent dust separating device which separates entrained catalyst particles from the product vapors for return to the dense catalyst phase. The substantially dust free vapors are finally passed through line 15 to a conventional recovery equipment, not shown.

The reactor 10 may be maintained at a temperature between about 800 and 1100° F., preferably between about 900 and 1050° F. Reactor pressure may be of the order of about 1 to 25 P. S. I. G., though higher pressures may likewise be used under proper circumstances. The catalyst employed may be a composite synthetic gel containing silica and alumina, further promoted with other metal oxides if desired, or it may be an activated carbon, clay or the like, as is well known in the art. The catalyst particles have a diameter preferably smaller than about 300 to 400 microns, for instance, between about 20 and 150 microns.

As the catalyst in reactor 10 becomes deactivated by formation of carbonaceous deposits thereon in the course of the cracking operation, spent catalyst particles are withdrawn from the bottom of the reactor and passed through opening 19 to a conventional regenerator, not shown, where the carbonaceous deposit may be burned and wherefrom the regenerated catalyst may be returned with fresh feed to the reactor. However, before the spent catalyst particles are passed to the regenerator, it is important to remove therefrom entrained hydrocarbon vapors so as to maintain a reasonably long catalyst life and maximum process economy as mentioned earlier herein.

Accordingly, spent catalyst from the fluidized reaction zone 13 is overflowed into and passed downwardly through a stripping well 17 formed between the outer reactor shell 10 and cylindrical sleeve 16 which may surround the conical distributor 12. In the stripping well the spent catalyst is contacted with an inert stripping gas such as steam or nitrogen which is introduced through a plurality of steam injectors 18 spaced at regular intervals at the bottom of the stripping well 17.

While the general construction and operation of the described system is conventional, the essence of the present invention lies in the particular baffling arrangement of the stripping section 17. Specifically, the invention requires the use of a plurality of short plate-type baffles which are affixed either to the outer wall of the cylindrical sleeve 16 or to the inside of shell 10 or to both, and extend radially into or across the stripping well at an angle of about 30 to 60° from the horizontal. All the baffles in a given stripping section or annulus are slanted in one direction and are preferably arranged so as to form regular vertical rows 21, 22, 23, 24 and so on, as well as horizontal rows a, b, c and d, as particularly shown in Figure 2 of the drawing.

As a consequence of this arrangement when spent catalyst which contains strippable material overflows from the reaction zone or dense catalyst phase 13 into the stripping well 17, the portion of catalyst flowing, for instance, onto baffle 24a in vertical row 24 and horizontal row a at the point indicated by arrow 20 will be at least partially deflected sideways by baffles 24a, 23b, 22c and 21d in succession. Thus all catalyst will flow downward through well 17 in an essentially helical path as approximately illustrated in Fig. 2 by the arrows between the baffles.

Thus the helical catalyst stream consecutively crosses steam vapor rising through each of the vertical channels which separate the adjacent vertical rows of baffles. A steam jet 18 is located at the bottom of each channel so as to emit stripping gas at an upward superficial velocity of about 0.05 to 3.0 feet per second. The total amount of stripping steam may range between about 1 and 5 pounds per pound of catalyst.

It will be understood, of course, that instead of the four horizontal rows of baffles shown in the drawing, a substantially greater number may be used, depending mainly on the height of the cylindrical sleeve 16. Also, instead of having the baffles arranged in vertical rows as shown with straight vertical channels therebetween, the baffles may be staggered so as to prevent stripping steam from steam jets 18 from rising in a straight vertical path. However, arrangements causing a plurality of vertical steam paths are definitely preferred since this, together with a helical catalyst path, assures crossing of the catalyst stream and the several steam streams and the possibility of any portion of the catalyst being left unstripped due to plugging of any particular steam jet is substantially eliminated. In contrast, with a staggered baffle arrangement, the likelihood of countercurrent helical flow, rather than cross-flow, of catalyst and steam is increased with a correspondingly increased risk of portions of the catalyst being left unstripped as in the more conventional cellular strippers.

The flow of catalyst provided by this inclined baffle arrangement results in all the catalyst being intimately contacted with the rising stripping steam. Furthermore, even if one or more steam injectors 18 becomes inoperative due to plugging, the stripping will remain at a very high efficiency since the catalyst will be contacted with steam from other nozzles further on in its helical path downward. This system also eliminates difficulty due to any possible preferential flow of catalyst over one side of sleeve 16 since in the present case the helical motion rapidly causes more uniform distribution of the catalyst throughout the stripping well. It is, of course, possible to use various auxiliary means on the sides of sleeve 16 in order further to insure uniform flow of solids into the stripping well over the entire periphery.

The stripped catalyst particles emerging in fluidized condition from the bottom of annular catalyst well 17 pass down to catalyst outlet 19 whence they may be transported in known manner to a conventional catalyst regenerator by way of a standpipe and transfer line, not shown.

Figure 4:
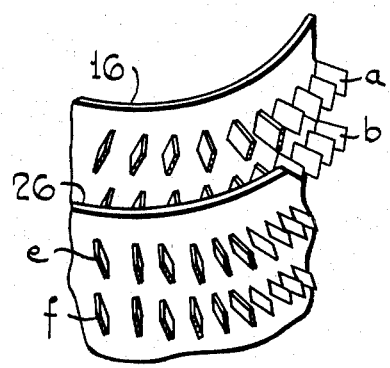
Figure 4 is a sectional perspective view taken on line IV—IV of Fig. 3 and showing the two concentric stripping sections having baffles inclined in opposite directions to minimize torque.

Another stripper design embodying the present invention is illustrated in Figures 3 and 4. Referring specifically to these figures, it will be noted that this embodiment contains an additional cylindrical sleeve 26 in stripping well 17 which divides this well into an inner annulus A and an outer annulus B. Each annulus again contains plate-type baffles which may be affixed to either or both the outer and inner walls which define the annulus. As in the previously described embodiment, the baffles extend radially into or across the stripping well at an angle of about 30 to 60° from the horizontal and all the baffles in a given stripping section or annulus are inclined in one direction. However, in this preferred embodiment all the baffles in annulus A are inclined in the opposite direction to the baffles in adjacent annulus B.

As a result of this arrangement, the torque exerted by the helical downward flow of catalyst through one annulus may be closely counterbalanced by the opposite flow of catalyst in other annulus. Such mechanical balance may be particularly important in commercial catalytic cracking units wherein catalyst frequently circulates through the unit at a rate of the order of about 30 tons per minute, or about 120 railroad box cars per hour, which may cause appreciable strains in unbalanced units thus requiring heavier construction and additional bracing. On the other hand, the somewhat more elaborate balanced design just described permits materially lighter construction.

It will be understood that, although Figure 1 shows an arrangement wherein the catalyst level L in the reactor is maintained well above the top of the cylindrical sleeve 16 so that the annular stripping well 17 is filled with dense phase catalyst, it is also possible to arrange the equipment so that the catalyst level L is maintained only slightly higher than the top of sleeve 16 so that the catalyst flows over it as over a weir, and the dense phase catalyst level in stripping well 17 may then be controlled at any desired level. Alternatively, the sleeve 16 may be extended further toward the top of the reactor and a series of orifices provided in the side of sleeve 16 for equal distribution of solids circumferentially around the stripper in a manner known to the art. It has been found that under some conditions improved stripping efficiency is obtained when part of the catalyst in the stripping well is in the dispersed phase condition and part is in a dense phase.

Figures 5, 6:
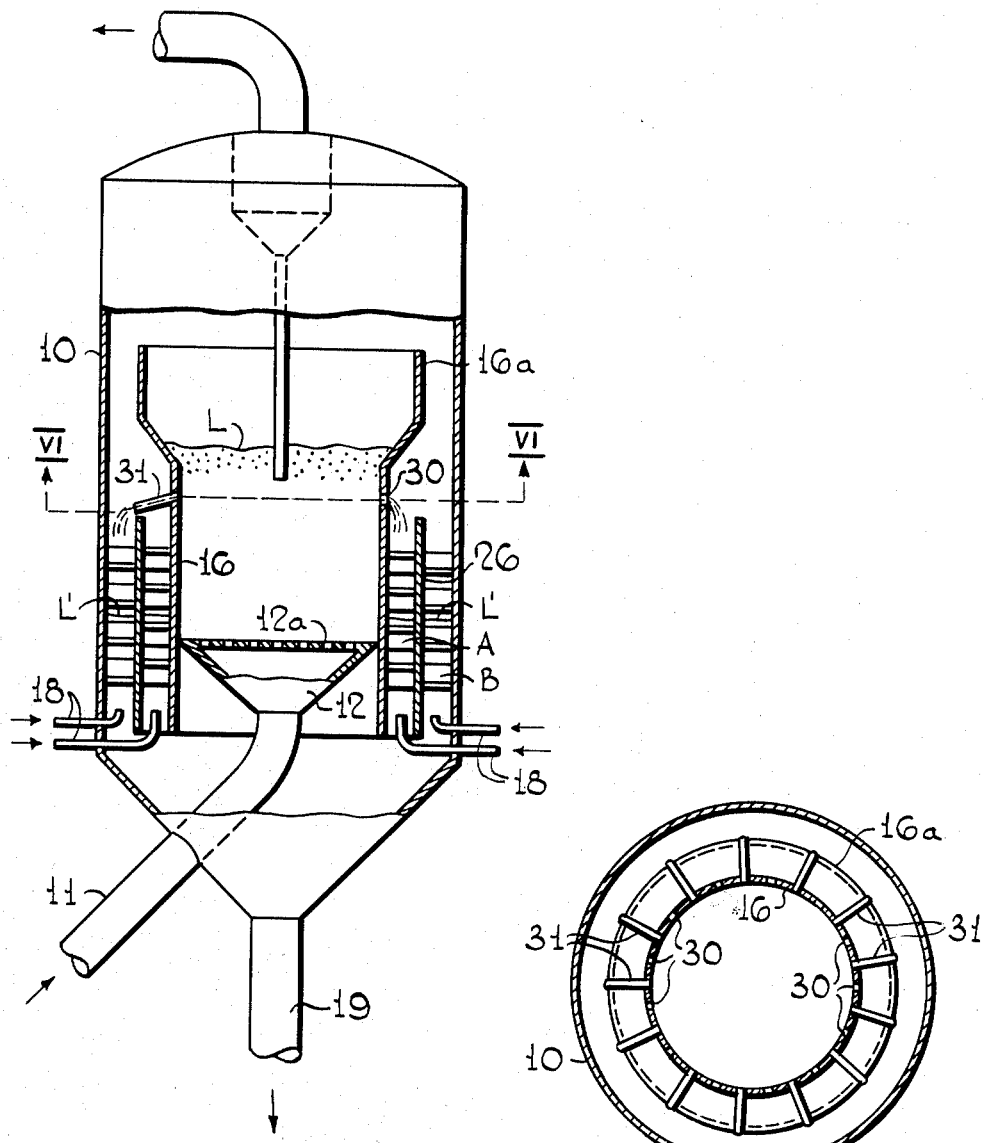

It may also be desirable to operate equipment such as described in connection with Figures 3 and 4 so that the catalyst in the stripping wells is partly in the dispersed phase and partly in dense phase condition. For this purpose, equipment as shown in Figures 5 and 6 may be used. Here the cylindrical sleeve 16 is extended upward into the dispersed phase of the reactor above the level L, and it may be expanded in diameter in the upper section as at 16a. A series of orifices 30 is arranged circumferentially around the sleeve 16 to provide equally distributed flow of catalyst all around the inner section A of stripping well 17. At essentially the same level on sleeve 16, and alternately with the orifices 30, a series of nozzles 31 is provided to carry catalyst to the outer section B of stripping well 17. These can be arranged with orifices in sleeve 16 of essentially the same diameter as orifices 30, and larger diameter pipes 31 to transport the catalyst to the outer section B, or the nozzles 31 can be made of such diameter that they provide themselves the necessary pressure drop to insure equal distribution of catalyst throughout the outer section B of the stripping well. With this arrangement, the level $L^1$ of catalyst in the stripping well 17 may be held at any point within well 17 by properly adjusting the slide valves, not shown, controlling the rate of flow of catalyst into and out of the reactor 10 through lines 11 and 19, respectively.

The importance of maintaining good stripping throughout the course of an entire operation is illustrated in the following example. The stripping efficiency of a conventional cellular baffled stripper installed in a commercial catalytic cracking unit was measured shortly after the beginning of an actual commercial cracking run when all the steam nozzles were operative, and again in another run on the same unit at a time when seven of the seventy-two injectors used for admitting steam to the stripper became plugged due to various causes and several other nozzles were partially plugged so that they did not receive their full quota of steam. The results are summarized in the table.

*Table*

| Test No. | 1 | 2 |
|---|---|---|
| Stripping Conditions | All Steam Injectors Open | With Seven Plugged Steam Injectors |
| Catalyst Rate to Stripper, tons/min | 31 | 35 |
| Stripping Steam Rate, lb./1000 lbs. of catalyst | 2.5 | 3.0 |
| Reactor Temperature, °F | 901 | 905 |
| Results: | | |
| Average molecular weight of hydrocarbons in gas associated with catalyst leaving stripper | 50 | 63 |
| Mol. percent of hydrocarbons in gas associated with catalyst leaving stripper | 11 | 21 |
| Weight percent strippable carbon based on catalyst circulated through stripper | 0.032 | 0.076 |

The above results show that although the total rate of stripping steam at the time of the second test was 20% higher than in the first test, and more than enough to compensate for the slightly increased catalyst throughput, the stripping efficiency had dropped very materially due to the plugging of some of the steam injectors. Specifically, the gas associated with the stripped catalyst was almost twice as rich in hydrocarbons when seven injectors were plugged than when all the injectors were clear, and the gas had a greater average molecular weight. Also, it can be seen that the amount of strippable carbon associated with the spent catalyst in a conventional stripper, that is, the amount of combustible matter which could have been but was not stripped out, may be more than doubled by the plugging of about 10% of the total steam injectors installed.

As a result, whereas practical strippable carbon values obtainable with good stripping are smaller than 0.05, and preferably smaller than 0.03 weight percent on catalyst at stripping steam rates between about 2 to 5 lbs./1000 lbs. of catalyst, in a conventional stripper having individual cells each served by a single steam injection nozzle, even partial plugging of a few such nozzles may increase the strippable carbon value sharply and thus put an undue load on the regeneration equipment. In contrast, the present invention assures positive contact of every fraction of the catalyst with steam from at least some of the steam injectors, even when some other injectors are plugged. Consequently, even with some nozzle plugging, stripping efficiency can be maintained at a high, substantially uniform level throughout runs which may last as long as a year or more.

Having described two specific embodiments of the invention, it will be understood that similar advantages may be realized with still other embodiments of this invention. For instance, a different total number of individual baffle plates as well as rows of plates than that illustrated herein can be used. Also, even when two or more sleeves are employed so as to create a plurality of preferably concentric annular stripping wells, it may not be necessary to counterbalance the torque and consequently all baffle plates in all annuli may be inclined in substantially the same direction, each annulus, of course, being provided with a separate system of injectors for the stripping gas. Also, in the event that the baffles of adjacent annuli or stripping sections are inclined in opposite directions, it may be desirable to incline the baffles in the inner annulus at a greater angle from the vertical than those in the outer annulus, so as to balance the torque better. Still other modifications and variations may become apparent to persons skilled in the art without departing either from the spirit of the invention described herein or from its scope as particularly defined in the appended claims.

I claim:

1. In a process wherein hydrocarbons are cracked in a conversion zone at conversion conditions in contact with a dense, turbulent bed of fluidized catalyst, the improved stripping method which comprises overflowing a mixture of fluidized partially spent catalyst and hydrocarbons from the dense bed into a plurality of adjacent concentric annular stripping zones, passing the fluidized catalyst mixture through the annular stripping zones as helical downward streams, the rotation of the helical stream in one annular stripping zone being in the opposite direction to the rotation of the helical stream in an adjacent stripping zone, thereby counterbalancing the torque produced by the flow of the catalyst, injecting a plurality of spaced streams of an inert stripping gas at the bottom of each annular stripping zone and allowing the gas streams to rise in a substantially vertical direction, thereby causing each helical stream of catalyst to cross a plurality of the said rising gas streams, and withdrawing stripped catalyst from a bottom portion of the said annular stripping zones.

2. Apparatus for contacting powdered solids and gases comprising a vessel adapted to contain a fluidized bed of solid particles part of which are in the dense phase and part in the dispersed phase and having a top outlet for gaseous fluid and a bottom outlet for solid particles, an inlet member arranged in the lower part of said vessel provided at its upper end with an outlet, said outlet being arranged centrally of said vessel and spaced from the inner wall of said vessel, a vertically arranged annular baffle member in the dense phase in sealed contact with the outlet extending downwardly therefrom arranged to provide an annular space between said inner wall of said vessel and said baffle member constituting a stripping section for downward flow of the fluidized particles from the dense phase, a plurality of spaced baffle plates placed in circumferential rows in said space, the baffle plates being arranged in vertical rows separated by substantially unobstructed vertical channels, all baffle plates being slanted from the vertical in one direction to cause the powdered solids descending from the dense phase through the channels to pass downwardly as streams in essentially helical paths, a plurality of injectors opening upwardly between adjacent baffle plates near the bottom of said stripping section to introduce streams of vertically rising stripping gas into the lower portion of said annular space whereby the helical catalyst streams consecutively cross the streams of stripping gas rising through each of the vertical channels and are stripped thereby.

3. Apparatus for contacting powdered solids and gases according to claim 2 in which the baffle plates are cemented at an angle of about 30° to 60° to the horizontal.

4. Apparatus for contacting powdered solids and gases comprising a vessel adapted to contain a fluidized bed of solid particles part of which are in the dense phase and part in the dispersed phase and having a top outlet for gaseous fluid and a bottom outlet for solid particles, an inlet member arranged in the lower part of said vessel provided at its upper end with an outlet, said outlet being arranged centrally of said vessel and spaced from the inner walls of said vessel, concentric vertically arranged annular baffle members in the dense phase one of which is in sealed contact with the outlet extending downwardly therefrom arranged to provide annular spaces between said inner wall of said vessel and said baffle member constituting stripping sections for downward flow of the fluidized particles from the dense phase, a plurality of spaced baffle plates placed in circumferential rows in each space, the baffle plates being arranged in vertical rows separated by substantially unobstructed vertical channels, all baffle plates of one section being slanted from the vertical in one direction to cause the powdered solids descending from the dense phase through the channels to pass downwardly as streams in essentially helical paths, all baffle plates of the other section being slanted from the vertical in the opposite direction to cause the powdered solids descending from the dense phase through the channels of that section to pass downwardly as streams in essentially opposite helical paths, a plurality of injectors opening upwardly between adjacent baffle plates near the bottom of each stripping section to introduce streams of vertically rising stripping gas into the lower portion of each stripping section whereby the helical catalyst streams consecutively cross the streams of stripping gas rising through each of the vertical channels and are stripped thereby.

5. Apparatu for contacting powdered solids and gases according to claim 4 in which the baffle plates are slanted at an angle of about 30° to 60° to the horizontal.

6. Apparatus for contacting powdered solids and gases including a vessel adapted to contain a fluidized bed of solid particles part of which are in the dense phase and part in the dispersed phase and having a top outlet for gaseous fluid and a bottom outlet for solid particles, an inlet member arranged in the lower part of said vessel provided at its upper end with an outlet, said outlet being arranged centrally of said vessel and spaced from the inner wall of said vessel, a vertically arranged annular baffle member in the dense phase and extending upwardly into the dispersed phase in sealed contact with the outlet and extending downwardly therefrom arranged to provide an annular space between said inner wall of said vessel and said baffle member, a second annular baffle member disposed between the vessel and the first mentioned annular baffle member dividing the space into annular chambers, means for directing solid particles from the dense phase to each of the annular chambers constituting a stripping section for downward flow of the fluidized particles, each annular space having a plurality of spaced baffle plates placed in circumferential rows in said spaces, the baffle plates being arranged in vertical rows separated by substantially unobstructed vertical channels, all baffle plates of one stripping section being slanted from the vertical in one direction to cause the powdered solids descending from the dense phase through the channels to pass downwardly as streams in essentially helical paths, all baffle plates of the other annular stripping section being slanted in the opposite direction, a plurality of injectors opening upwardly between adjacent baffle plates near the bottom of each stripping section to introduce streams of vertically rising stripping gas into the lower portion of each annular space whereby the helical catalyst streams consecutively cross the streams of stripping gas rising through each of the vertical channels and are stripped thereby.

7. Apparatus for contacting powdered solids and gases according to claim 6 in which the baffle plates are slanted at an angle of about 30° to 60° to the horizontal.

References Cited in the file of this patent
UNITED STATES PATENTS

| | | |
|---|---|---|
| 2,415,756 | Le Roi et al. | Feb. 11, 1947 |
| 2,485,318 | Rollman | Oct. 18, 1949 |
| 2,541,801 | Wilcox | Feb. 13, 1951 |
| 2,554,426 | Strunk et al. | May 22, 1951 |